(12) United States Patent
Chen

(10) Patent No.: US 10,495,755 B2
(45) Date of Patent: Dec. 3, 2019

(54) AUTOMOBILE ULTRASONIC DETECTION METHOD AND SENSOR

(71) Applicant: Wuqiang Chen, Xiamen (CN)

(72) Inventor: Wuqiang Chen, Xiamen (CN)

( * ) Notice: Subject to any disclaimer, the term of this patent is extended or adjusted under 35 U.S.C. 154(b) by 0 days.

(21) Appl. No.: 16/074,692

(22) PCT Filed: Jan. 25, 2017

(86) PCT No.: PCT/CN2017/072584
§ 371 (c)(1),
(2) Date: Aug. 1, 2018

(87) PCT Pub. No.: WO2017/148234
PCT Pub. Date: Sep. 8, 2017

(65) Prior Publication Data
US 2019/0064351 A1 Feb. 28, 2019

(30) Foreign Application Priority Data

Mar. 4, 2016 (CN) .......................... 2016 1 0122776

(51) Int. Cl.
*G01S 15/93* (2006.01)
*G01S 15/04* (2006.01)
*G01S 7/521* (2006.01)

(52) U.S. Cl.
CPC ............. *G01S 15/931* (2013.01); *G01S 7/521* (2013.01); *G01S 15/04* (2013.01); *G01S 2015/932* (2013.01); *G01S 2015/938* (2013.01)

(58) Field of Classification Search
CPC ........ G01S 15/931; G01S 15/04; G01S 7/521; G01S 2015/932; G01S 2015/938
See application file for complete search history.

(56) References Cited

U.S. PATENT DOCUMENTS

2005/0264902 A1* 12/2005 Rennick .................. G01S 7/521
359/841
2010/0245066 A1* 9/2010 Sarioglu ................. G01S 7/003
340/436

(Continued)

FOREIGN PATENT DOCUMENTS

CN            2248896         3/1997
CN          101144835         3/2008

(Continued)

OTHER PUBLICATIONS

International Search Report issued in the corresponding PCT application No. PCT/CN2017/072584, dated Apr. 28, 2017, 7 pages.

*Primary Examiner* — Brian A Zimmerman
*Assistant Examiner* — Sara B Samson
(74) *Attorney, Agent, or Firm* — Hamre, Schumann, Mueller & Larson, P.C.

(57) ABSTRACT

Automobile ultrasonic detection method and a sensor are provided. Specifically, a plurality of microphones in the sensor are controlled to work cooperatively, and the microphones respectively transmit or receive detection signals to or from the outside by adopting different working frequencies in a mutually spaced working time sequence; and in a detection cycle of a single microphone, the sensor completes multiple times of detection to improve the detection response speed of the sensor. Through specific drive and control of the electronic circuit unit on the microphones with different frequencies, the detection response speed of the ultrasonic sensor can be greatly improved. The sensor applied to an automobile also further improves the driving safety of the automobile.

11 Claims, 12 Drawing Sheets

(56) References Cited

U.S. PATENT DOCUMENTS

2011/0242942 A1* 10/2011 Tsuzuki .................. G01S 7/521
367/121
2014/0198619 A1* 7/2014 Lamb ...................... G01S 15/42
367/99
2015/0124564 A1* 5/2015 Bartylla ................ G01S 15/931
367/99

FOREIGN PATENT DOCUMENTS

| CN | 101294796 | 10/2008 |
|---|---|---|
| CN | 101339249 | 1/2009 |
| CN | 103797379 | 5/2014 |
| CN | 105073281 | 11/2015 |
| CN | 105549022 | 5/2016 |

* cited by examiner

AUTOMOBILE ULTRASONIC DETECTION METHOD AND SENSOR

FIELD OF THE INVENTION

The present invention relates to an automobile ultrasonic detection method and a sensor.

BACKGROUND OF THE INVENTION

The use of ultrasonic sensors in an automobile, e.g., commonly known as reversing radars in an automobile, i.e., a front and rear parking assist system, is increasingly popular. The surrounding environments in front and back of the automobile are detected via ultrasonic sensors arranged in the front and the back of the automobile to judge objects and clear blind areas through the use of the ultrasonic detection technology and the ultrasonic sensors.

At present, the semi-automatic or automatic parking system (hereinafter collectively referred to as an automatic parking system) additionally applied to the automobile also detects the surrounding environments via ultrasonic sensors, and seeks and recognizes a parking plot via automatic parking sensors. The automobile blind spot monitoring system (or referred to as an automobile blind spot assist system) applied to some automobiles at present also adopts the ultrasonic detection technology, and it detects the blind areas that cannot be observed from the left and the right lane exterior mirrors of the automobile via blind spot sensors to assist the driver in changing lanes and driving.

As shown in FIG. 1, parking sensors 16 and 13 (also referred to reversing radar sensors) are provided and respectively arranged at different positions in the front and the back of an automobile, with four or two sensors in the front and four, three or two sensors in the back. Generally, the blind spot sensors 11 and 12 are arranged separately on the left back part and right back part of the automobile with one for each part. The automatic parking sensors 14, 15, 17 and 18 are arranged separately on the front left side, the front right side, the back left side and the back right side of the automobile with one for each side; the automatic parking sensors 14 and 15 also serve as auxiliary sensors of the ultrasonic blind spot monitoring system, and some automatic parking systems only have the two automatic parking sensors 14 and 15, eliminating the automatic parking sensors 17 and 18.

The sensors applied to automobiles at present, e.g., the parking sensors 16 and 13, the blind spot sensors 11 and 12 and the automatic parking sensors 14, 15, 17 and 18, are all traditional ultrasonic sensors. As the functions of the sensors vary, the detection properties required by various sensors are also different. On the requirement for the detection response speed, the reversing radar sensors (parking sensors 16 and 13) are used for the starting and parking of the automobile, so the requirement for the response speed of the sensors is relatively low. The blind spot sensors 11 and 12 are required of a relatively high response speed, because they are applied in the driving process of the automobile (including at high speeds). For the automatic parking sensors 14, 15, 17 and 18, the sensors 14 and 15, which also serve as auxiliary sensors of the blind spot monitoring system, they are required of a relatively high response speed due to their use at low, medium and high speeds.

The detection capability of a sensor is usually based on the detection of the sensor on a PVC water pipe with a diameter of 75 MM (hereinafter, the PVC water pipe with the diameter of 75 MM is referred as a standard bar) (ISO standard). The longest detection distance determines the maximum detection capability of the sensor. The stronger the detection capability of the sensor is, the longer the longest detection distance on the standard bar is, and The weaker the detection capability of the sensor is, the shorter the longest detection distance on the standard bar is.

As regards to the detection capability of the sensors, as the parking sensors 16 and 13 are used for short-distance detection,—the requirement for the detection capability of the sensors is relatively low. Generally, the ranges of the sensors are set to be about 2.5M, which is capable enough to meet the requirement of the system to detect the standard bars within about 2M.

The blind spot sensors 11 and 12 are required for detecting vehicles on the left and right lane blind areas of the exterior mirrors of the automobile, so the requirement for the long-distance detection capability of the sensors is relatively high. Generally, the ranges of the sensors are set to be 4-6 meters, and the sensors are required to detect the standard bars within 4-5M.

The automatic parking sensors 14, 15, 17 and 18 are used for detecting and recognizing the environmental state of a parking plot, so the requirement for the long-distance detection capability of the sensors is relatively high. Generally, the ranges of the sensors are set to be 4-6 meters, and the sensors are required to detect the standard bars within 4-5M.

The long-distance detection capability and the detection response speed are two most important performance indexes of an ultrasonic sensor.

When the traditional ultrasonic sensor detects an object, the range of the sensor is set as L, the ultrasonic transmission speed is set as V0 (usually 340 M/S), and the detection time for the sensor to complete a single detection is set as t. These parameters satisfy the condition: $t=2*L/V0$ (the ultrasonic propagation route is a round trip).

Herein, we suppose: the ranges of the parking sensors 16 and 13 are L1, wherein L1=2.5M, the time required for single detection of the traditional sensors is set as T25, i.e., the detection cycle is T25, and $T25=2*L1/V0=2*2.5M/(340M/S)=0.015S$, or rather 0.015 seconds; and when the sensors detect the standard bar at the distance of LG1, the schematic detection diagram is shown in FIG. 2. We suppose: the ranges of the blind spot sensors 11 and 12 and the automatic parking sensors 14, 15, 17 and 18 are L2, wherein L2=5M, the time required for single detection of the traditional sensors is set as T50, i.e., the detection cycle is T50, and $T50=2*L2/V0=2*5.0M/(340M/S)=0.03S$, or rather 0.03 seconds; and when the sensors detect the standard bar at the distance of LG2, the schematic detection diagram is shown in FIG. 3.

With the above assumptions, when the range is increased by one fold, the single detection time of the traditional sensors doubles, i.e., the detection cycle of the sensors doubles ($T50=2*T25$), but the detection response speeds of the blind spot sensors and the automatic parking sensors having high response speed requirement are lowered, thus causing serious adverse effects on the functions of the blind spot monitoring system and the automatic parking system.

In addition to the slowing down of the detection response speeds of the traditional sensors—due to the increase in the ranges, the long-distance detection capability of the blind spot sensors 11 and 12 and the automatic parking sensors 14, 15, 17 and 18 themselves is limited. This means even with the range of 5 meters, the sensors can hardly detect the standard bar at the distance of 4-5M because generally, they detect the standard bar at the distance of about 3M, and it becomes difficult for them to do so when the distance exceeds 3.5M. Therefore, the long-distance detection capability of the traditional sensors is not strong enough. The insufficiency in detection capability makes it difficult to complete and realize the blind spot monitoring function and the automatic parking function of the automobile, or even if the functions are realized, the performances of the blind spot monitoring system and the automatic parking system are compromised.

As the range increases, the single detection time of the ultrasonic sensor is also lengthened, while the detection response speed of the ultrasonic sensor slows. In order to solve this contradiction, the current solution features the conversion of the detection method of the ultrasonic sensor into the detection method of a microwave or millimeter wave sensor (probe) to improve the response speed. At present, no mature application example is available to solve this problem by improving the ultrasonic sensor itself. The microwave or millimeter wave sensor is limited in use, one main reason being that it costs much more than the ultrasonic sensor.

SUMMARY OF THE INVENTION

Aiming at the problems in the prior art, one objective of the present invention is to provide an automobile ultrasonic detection method adopting sensors with improved structures to achieve high-speed response, and the other objective of the present invention is to provide an automobile ultrasonic sensor for implementing the method.

In order to fulfill the above objectives, the present invention provides an automobile ultrasonic detection method, specifically, a plurality of microphones in a sensor are controlled to work cooperatively, and the microphones respectively transmit or receive detection signals to or from the outside by adopting different working frequencies in a mutually spaced working time sequence; and in a detection cycle of a single microphone, the sensor completes multiple times of detection to improve the detection response speed of the sensor.

Further, the working process of the plurality of microphones is as follows:
1) N microphones are set, wherein N≥2, including a microphone 1, a microphone 2 . . . and a microphone N;
2) the microphone 1, microphone 2 . . . and microphone N have different working frequencies, and the detection cycle of the single microphone is T;
3) the microphone 1 begins detecting objects at the moment t0, and the single detection of the microphone 1 is completed at the moment (t0+T);
4) the microphone 2 begins detecting objects at the moment (t0+T*(1/N)), and the single detection of the microphone 2 is completed at the moment (t0+T*(1+1/N));
5) the microphone 3 begins detecting objects at the moment (t0+T*(2/N)), and the single detection of the microphone 3 is completed at the moment (t0+T*(1+2/N)); and so on for the working manners of the following sensors, thus obtaining:
6) the microphone N begins detecting objects at the moment (t0+T*{(N−1)/N}), and the single detection of the microphone N is completed at the moment (t0+T*{1+(N−1)/N});

each microphone works cyclically within their working time according to their working time sequence, so that the detection cycle of the sensor becomes T*1/N, thus raising the detection response speed of the sensor.

The automobile ultrasonic sensor for implementing the above method includes a plurality of microphones and an electronic circuit unit, wherein the electronic circuit unit respectively controls the microphones to transmit or receive detection signals to or from the outside by adopting different working frequencies in a mutually spaced working time sequence.

Further, the plurality of microphones is combined into an integral structure.

Further, the sensor includes a housing assembly unit and gum cover units mounted inside the housing assembly unit, and the housing assembly unit is provided with a connector unit.

Further, the microphones are fixedly arranged in the housing assembly unit via the gum cover units, the connector unit is an external hardware interface of the sensor, and the sensor transmits signals to the outside via the connector unit.

Further, the electronic circuit unit drives the microphones and amplifies, filters and operates echo signals to obtain a detection distance.

Further, a plurality of groups of ultrasonic transmitting modules and ultrasonic receiving modules are integrated in the electronic circuit unit, and one group of ultrasonic transmitting module and one ultrasonic receiving module corresponding to one microphone to control its work.

Further, a singlechip is integrated in the electronic circuit unit.

Further, a power module and a communication module are integrated in the electronic circuit unit, and the sensor transmits signals to the outside via the communication module.

Further, the sensor is provided with three pins for external connection: PIN1, PIN2 and PIN4, or provided with four pins: PIN1, PIN2, PIN3 and PIN4; in the sensor, the PIN1 is connected with the power module, the PIN4 is a ground terminal, the PIN2 is connected with the communication module, or the PIN2 and the PIN3 are respectively connected with the communication module.

Further, when the sensor is used as a blind spot detection senor of an automobile blind spot monitoring system, the sensor is integrated with an automobile reflector.

Through the specific drive and control of the electronic circuit unit on the microphones with different frequencies, the detection response speed of the ultrasonic sensor can be improved greatly. The application of the present invention to an automobile has an extremely wide prospect, and is of great significance in further improving the automobile driving safety.

DETAILED DESCRIPTION OF THE INVENTION

Figure 1:
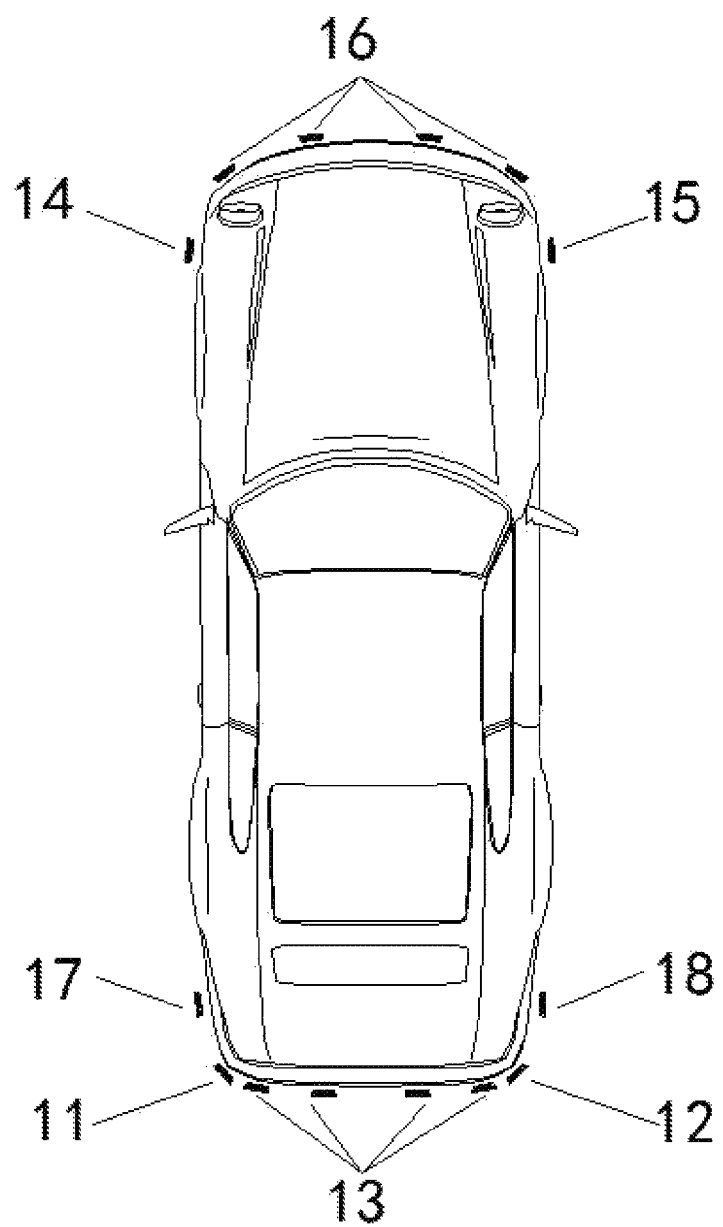
FIG. 1 is a schematic arrangement diagram of automobile ultrasonic sensors.

The present invention will be illustrated more comprehensively below with reference to the attached drawings, which show exemplary embodiments of the present invention. However, the present invention can be embodied in multiple different forms, and should not be interpreted as being limited to the exemplary embodiments described herein. These embodiments are provided for making the present invention comprehensive and integral and completely delivering the scope of the present invention to those of ordinary skill in the art.

In order to facilitate illustration, spatially relative terms such as "upper", "lower", "left" and "right" can be used herein for describing the relation between one element or feature and the other element or feature shown in a figure. It should be understood that the spatial terms are intended to include different directions of a device in use or operation besides the directions shown in the figures. For example, if the device in the figure is inverted, an element described as "below", other element or feature will be positioned "on" the other element or feature. Thus, the exemplary term "lower" may include upper and lower directions. The device can be positioned in other manner (rotated by 90 degrees or positioned in other direction), and the space herein can be correspondingly explained.

The present invention provides an automobile ultrasonic detection method, specifically, a plurality of microphones in a sensor are controlled to work cooperatively, and the microphones respectively transmit or receive detection signals to or from the outside by adopting different working frequencies in a mutually spaced working time sequence; and in a detection cycle of a single microphone, the sensor completes multiple times of detection to improve the detection response speed.

The automobile ultrasonic detection method of the present invention involves N microphones, and includes the following specific steps:

1) N microphones are set, wherein N≥2, including a microphone 1, a microphone 2 . . . and a microphone N;
2) the microphone 1, microphone 2 . . . and microphone N have different working frequencies, and the detection cycle of the single microphone is T;
3) the microphone 1 begins detecting objects at the moment t0, and the single detection of the microphone 1 is completed at the moment (t0+T);
4) the microphone 2 begins detecting objects at the moment (t0+T*(1/N)), and the single detection of the microphone 2 is completed at the moment (t0+T*(1+1/N));
5) the microphone 3 begins detecting objects at the moment (t0+T*(2/N)), and the single detection of the microphone 3 is completed at the moment (t0+T*(1+2/N)); and so on for the working form of the following microphones, thus obtaining:
6) the microphone N begins detecting objects at the moment (t0+T*{(N−1)/N}), and the single detection of the microphone N is completed at the moment (t0+T*{1+(N−1)/N});

each microphone works cyclically within their working time according to their working time sequence, i.e., a singlechip controls the microphone 1, microphone 2 . . . and microphone N to detect objects at the time interval of 1/N*T, so that the detection cycle of the sensor is T*1/N to improve the detection response speed of the sensor.

As is shown in FIGS. 4-14, an automobile ultrasonic sensor for implementing the above method includes a plurality of microphones (also referred to as probes), a housing assembly unit, gum cover units, an electronic circuit unit and a connector unit. A singlechip, a power module, a communication module and a plurality of groups of ultrasonic transmitting modules and ultrasonic receiving modules are integrated in the electronic circuit unit.

The microphones are fixedly arranged in the housing assembly unit via the gum cover units, and the electronic circuit unit drives the microphones and amplifies, filters and operates echo signals to obtain a detection distance; and the sensor transmits signals to the outside via the connector unit.

A plurality of groups of ultrasonic transmitting modules and ultrasonic receiving modules are integrated in the electronic circuit unit, and one group of ultrasonic transmitting module and one ultrasonic receiving module corresponding to one microphone to control its work. The electronic circuit unit respectively controls the microphones to transmit or receive detection signals to or from the outside by adopting different working frequencies in a mutually spaced working time sequence.

Moreover, the plurality of microphones and other components are combined into an integral structure to form a complete and independent ultrasonic sensor.

The automobile ultrasonic sensor of the present invention is provided with three pins or four pins for external connection, three pins: PIN1, PIN2 and PIN4, or four pins: PIN1, PIN2, PIN3 and PIN4. The PIN2 and the PIN3 are connected with the communication module, but in practical application, the sensor may also be provided with only one communication pin (instead of two). Thus, in the sensor, the PIN1 is connected with the power module, the PIN4 is a ground terminal, the PIN2 is connected with the communication module, or the PIN2 and the PIN3 are respectively connected with the communication module.

Figure 4:
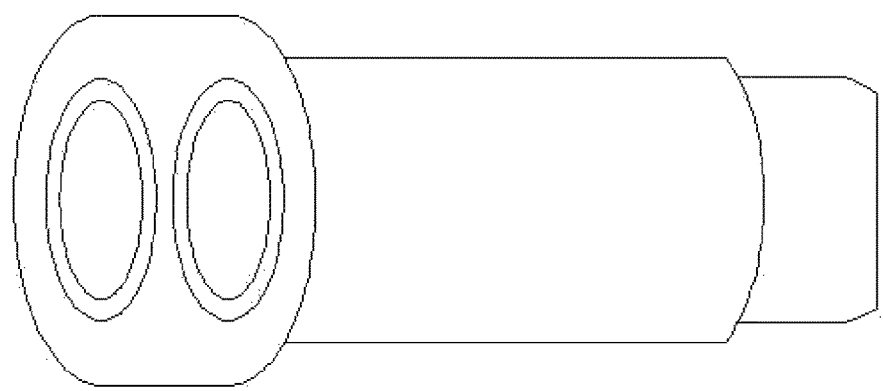
FIG. 4 is a three-dimensional structure diagram of a sensor provided with two microphones.
Figure 5:
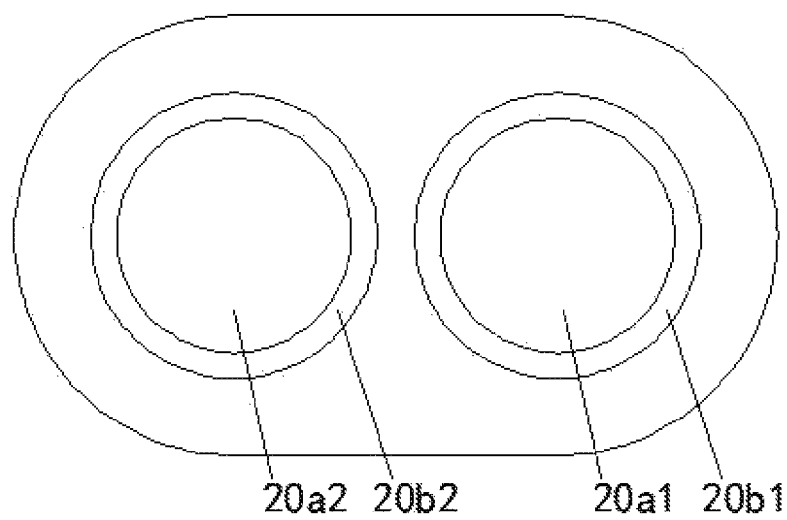
FIG. 5 is a schematic diagram of an end face of the sensor provided with two microphones.
Figure 7:
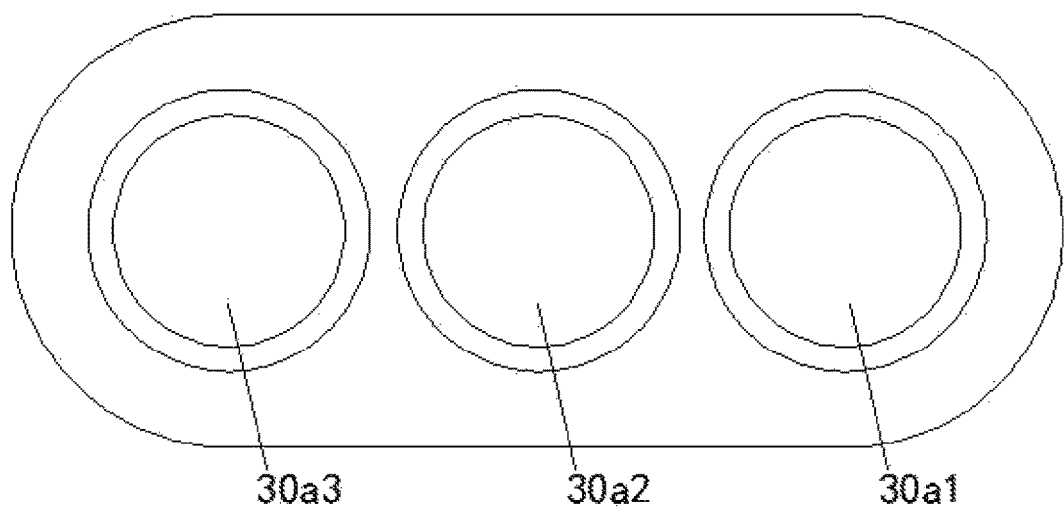
FIG. 7 is a structure diagram of the sensor provided with three microphones.
Figure 8:
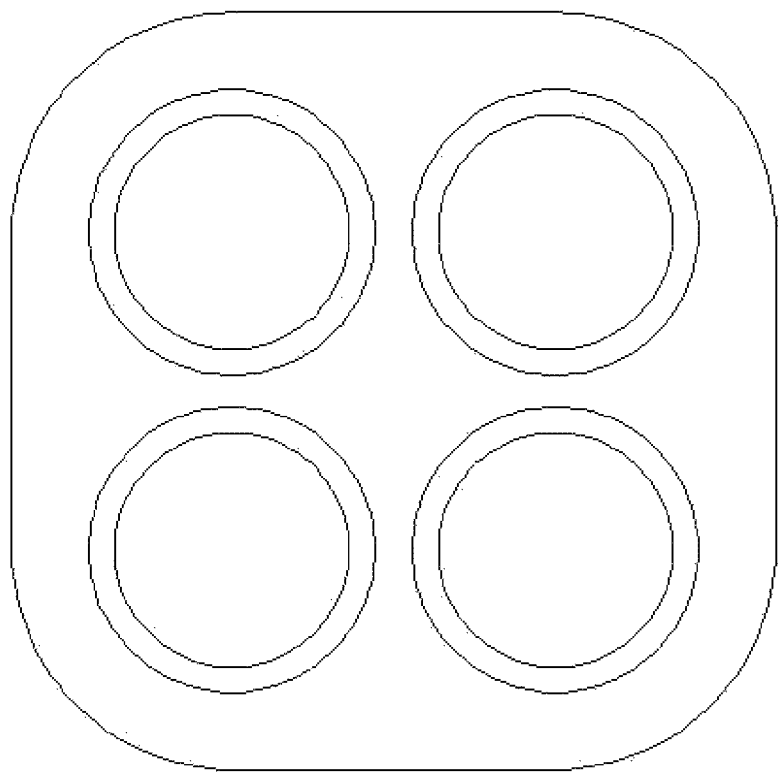
FIG. 8 is a structure diagram of the sensor provided with four microphones.
Figure 9:
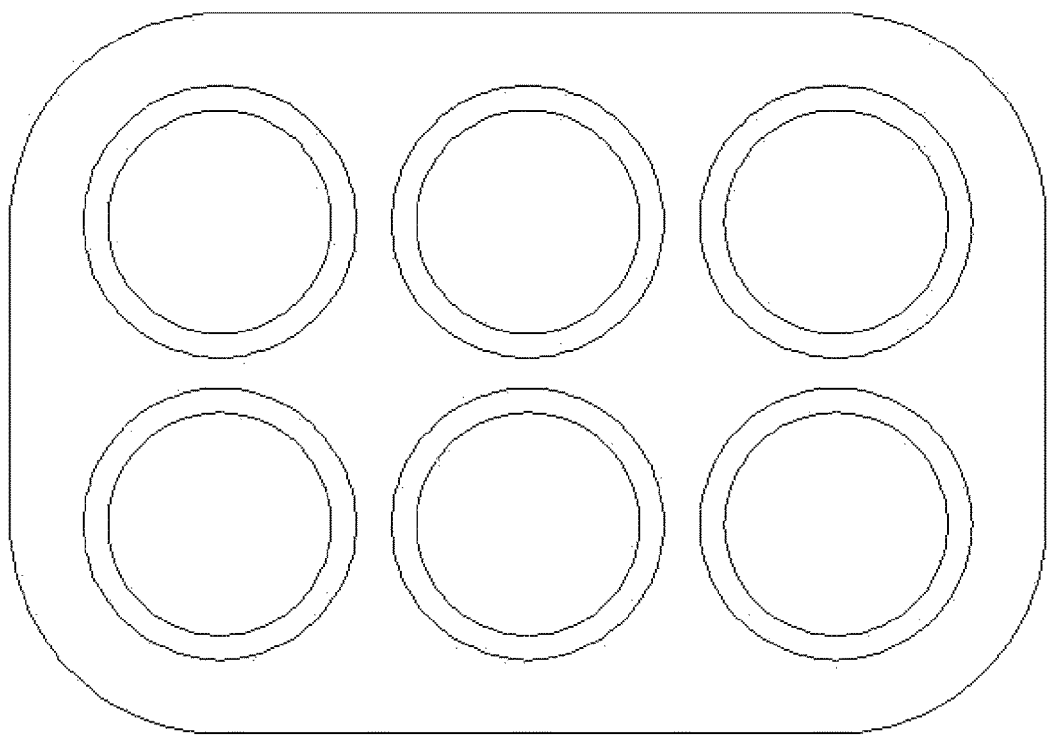
FIG. 9 is a structure diagram of the sensor provided with six microphones.

FIG. 4 and FIG. 5 show an automobile ultrasonic sensor provided with two microphones, FIG. 7 shows an automobile ultrasonic sensor provided with three microphones, FIG. 8 shows an automobile ultrasonic sensor provided with four microphones, and FIG. 9 shows an automobile ultrasonic sensor provided with six microphones.

Figure 6:
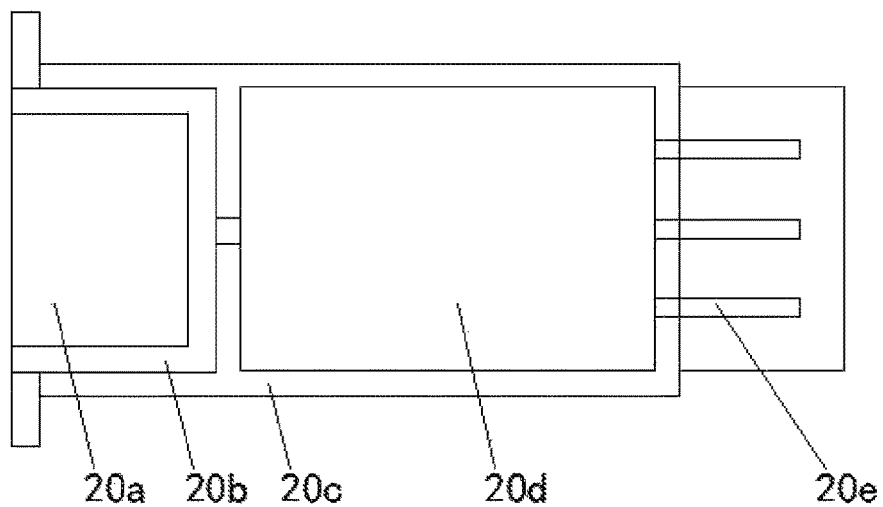
FIG. 6 is a structure diagram of the sensor provided with two microphones.

Embodiment 1:

Taking the two microphones arranged in FIGS. 4, 5 and 6 as an example, the specific illustrations are as follows:

The automobile ultrasonic sensor of the present invention includes a microphone 20a1, a microphone 20a2, a silica gel cover unit 20b1, a silica gel cover unit 20b2, an electronic circuit unit 20d, a connector unit 20e and a housing assembly unit 20c (containing possible filling gum). The silica gel cover unit 20b1 and the silica gel cover unit 20b2 can be designed into an integral structure according to the structural feature.

The silica gel cover unit 20b1 and the silica gel cover unit 20b2 provide protection and shock absorption effects for the microphones. The connector unit 20e realizes connection functions for hardware such as sensor power supply, data transmission and the like, and provides overall installation support and protection for the sensor together with the housing assembly unit 20c. All the units are assembled as a whole to make the sensor, and the sensor is usually filled with filling gum to realize a waterproof function (some sensors are directly structurally sealed by using the housing assembly to realize the waterproof function, rather than being encapsulated with the filling gum).

Two microphones, i.e., a microphone 20a1 and a microphone 20a2, are arranged in FIG. 4, and the internal circuit of the sensor is also correspondingly provided with two sets of circuit modules corresponding to the microphone 20a1 and the microphone 20a2 in relation to the driving, receiving, amplifying, filtering operations. The microphone 20a1 and the microphone 20a2 adopt different working frequencies, and the electronic circuit unit 20d drives the microphone 20a1 and the microphone 20a2 to work cooperatively according to different time sequences to detect the same environment (object). This means both microphone 20a1 and the microphone 20a2 work (transmit and receive) within the same time period, but they are staggered on the working time sequence.

Figure 2:
FIG. 2 is a schematic diagram that the traditional sensor detects a standard bar at the distance of LG1.
Figure 3:
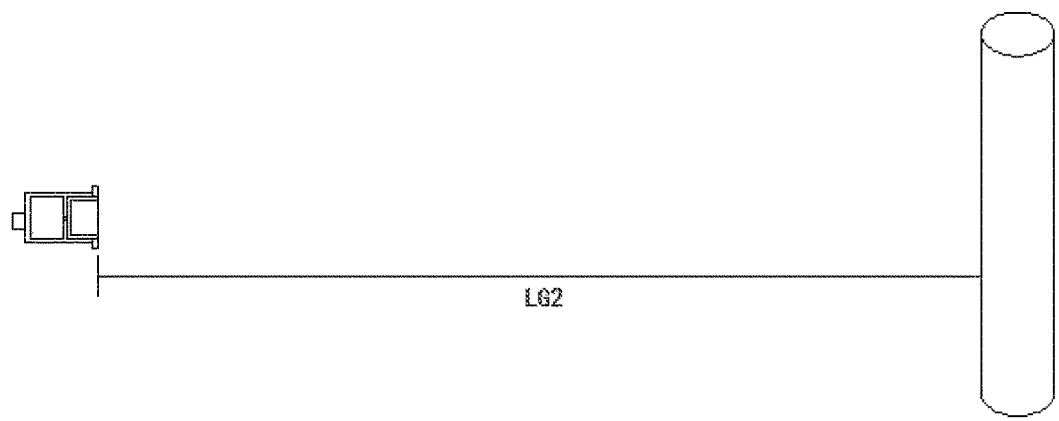
FIG. 3 is a schematic diagram that the traditional sensor detects a standard bar at the distance of LG2.
Figure 10:
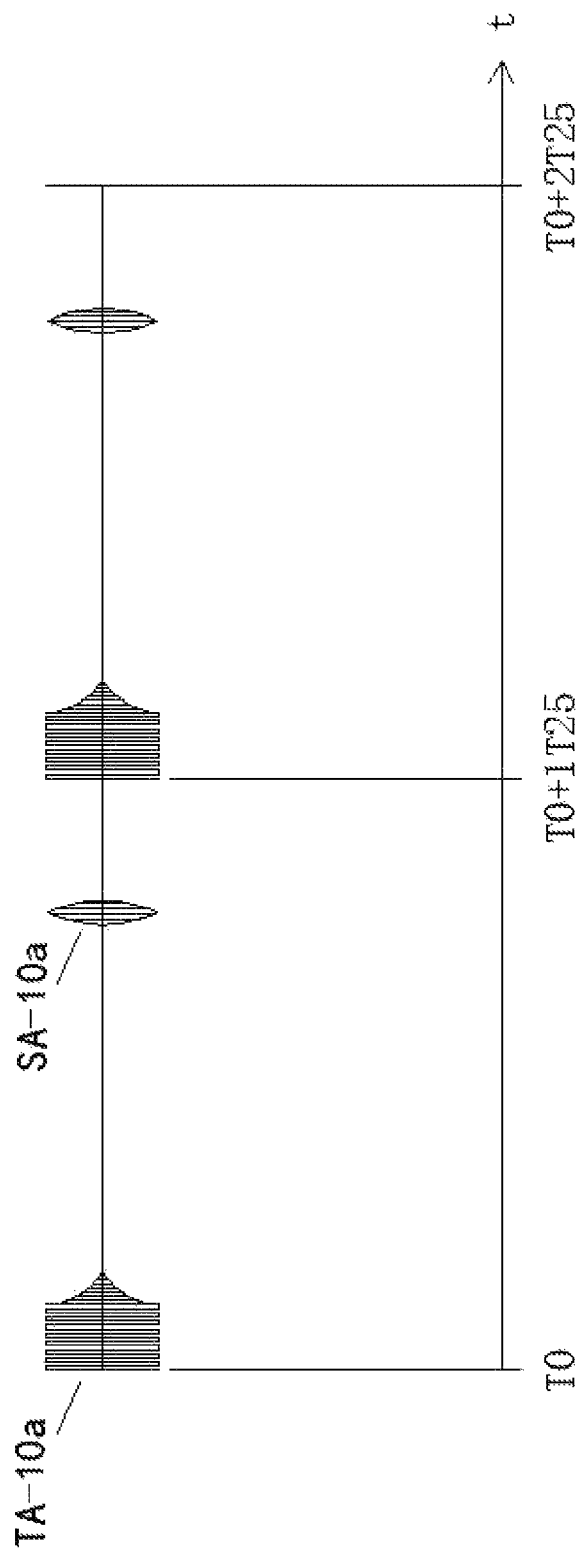
FIG. 10 is a schematic diagram of working time sequence signals when a traditional sensor detects a standard bar at the distance of LG1.

As shown in FIG. 2 and FIG. 10, the traditional single-microphone sensor detects a standard bar (a PVC water pipe with the diameter of 75 MM), wherein the range of the sensor is L1 (2.5M), the detection distance of the sensor on the standard bar is LG1, the generated working time sequence signals are shown in FIG. 10, TA-10a is a transmitted residual vibration signal of the microphone 10a, SA-10a is an echo signal of the microphone 10a, and the detection cycle of the sensor is T25.

Figure 11:
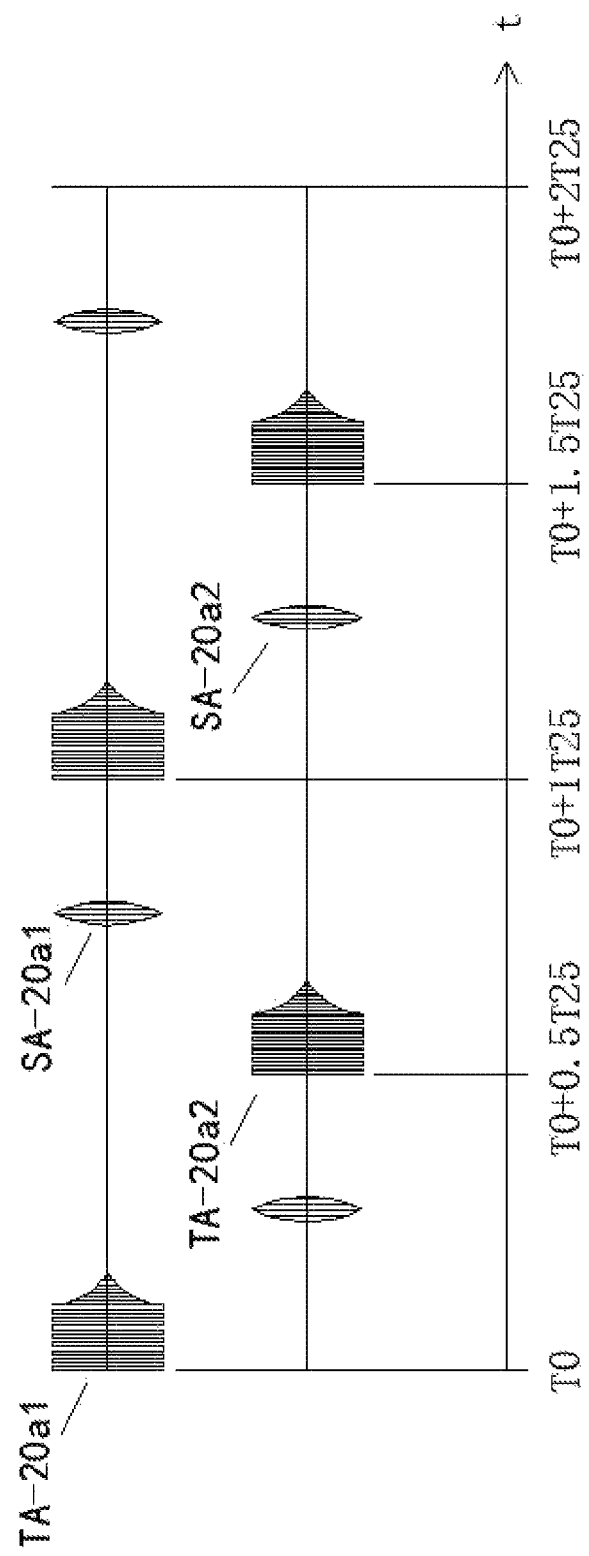
FIG. 11 is a schematic diagram of working time sequence signals when the sensor provided with two microphones detects the standard bar at the distance of LG1.

FIG. 4 and FIG. 5 show a two-microphone sensor. For detecting a standard bar, the range of the sensor is L1 (2.5M), the detection distance of the sensor on the standard bar is LG1, the generated working time sequence signals are shown in FIG. 11, TA-20a1 is a transmitted residual vibration signal of the microphone 20a1, SA-20a1 is an echo signal of the microphone 20a1, TA-20a2 is a transmitted residual vibration signal of the microphone 20a2, and SA-20a2 is an echo signal of the microphone 20a2. The electronic circuit unit 20d controls the beginning of transmission drive of the second microphone 20a2 at the time of 1/2*T25 after the transmission drive of the first microphone 20a1, and controls the beginning of transmission drive of the first microphone 20a1 at the time 1/2*T25 after the transmission drive of the second microphone 20a2. The two microphones do so circularly and it can be known from the time sequence diagram that the detection cycle of the two-microphone sensor is 1/2*T25. Thus, the detection cycle of the two-microphone sensor shown in this embodiment is half of that of the traditional single-microphone sensor. Therefore, the detection response speed of the two-microphone sensor in this embodiment doubles that of the traditional single-microphone sensor, i.e., resulting in the rapid increase in the response speed.

Embodiment 2:

FIG. 7 is a structure diagram of three microphones, including a microphone 30a1, a microphone 30a2 and a microphone 30a3.

Figure 12:
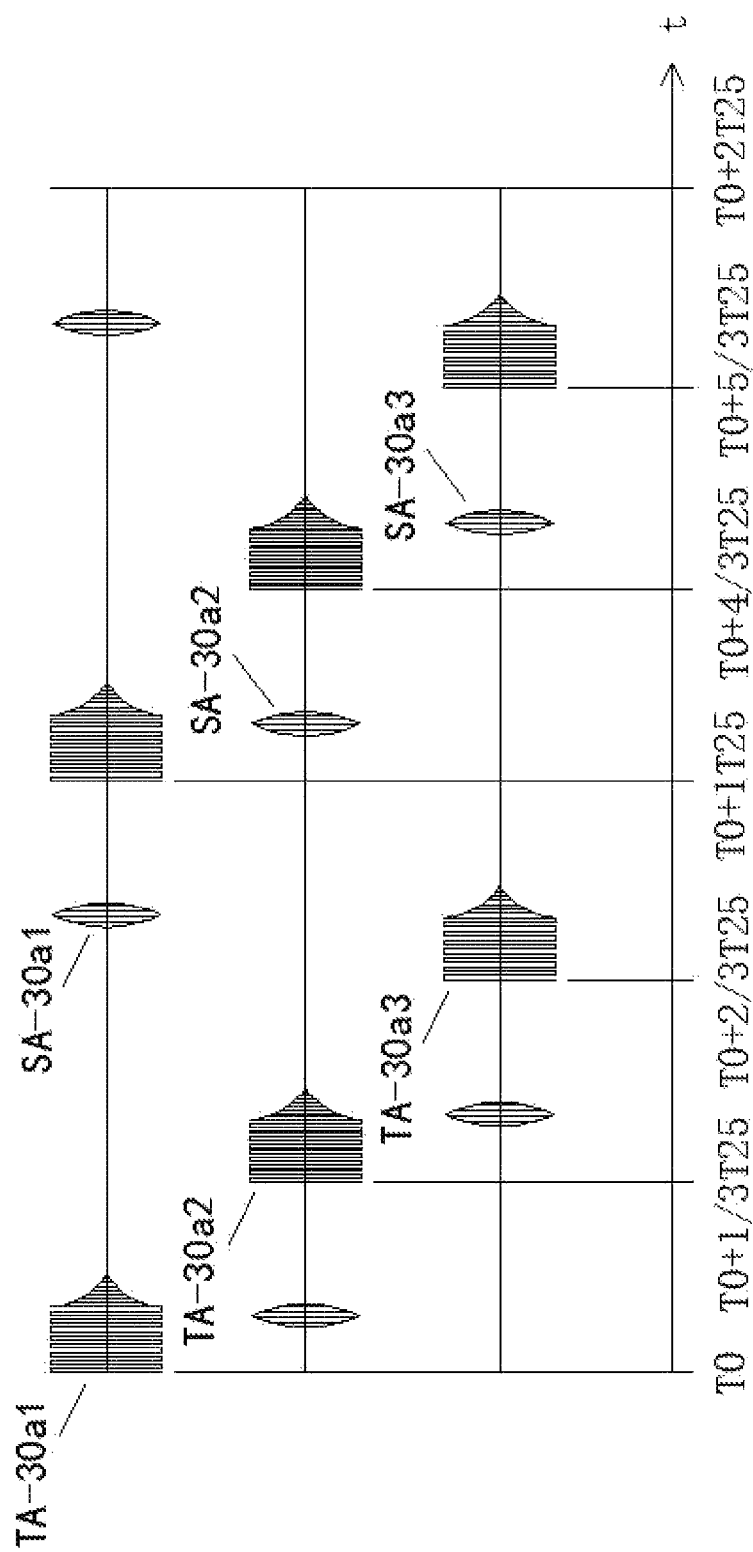
FIG. 12 is a schematic diagram of working time sequence signals when the sensor provided with three microphones detects the standard bar at the distance of LG1.
Figure 13:
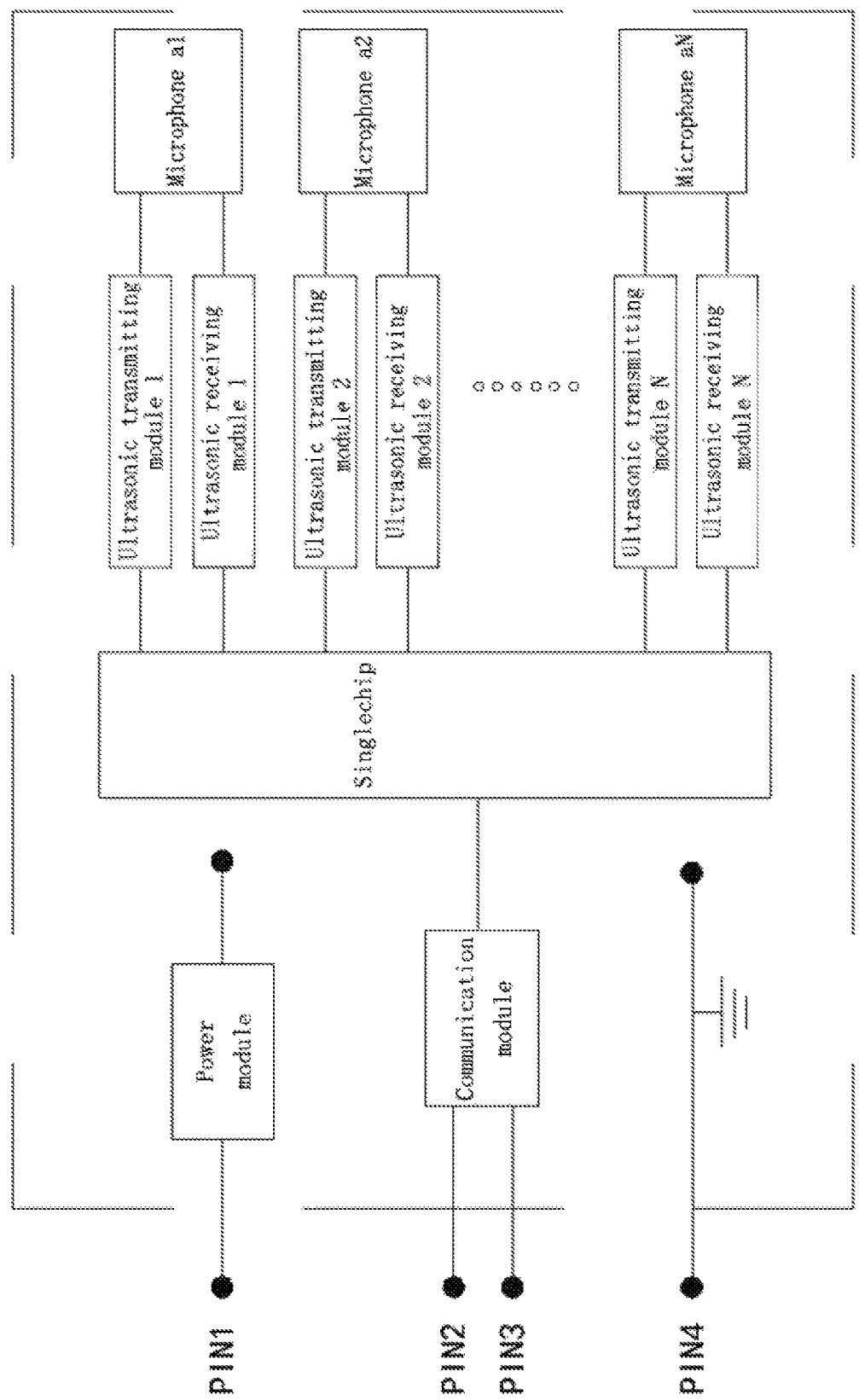
FIG. 13 is an internal principle block diagram of the sensor of the present invention.

The working time sequence signals of the three microphones are shown in FIG. 12. The electronic circuit unit of the three-microphone sensor controls the beginning of transmission drive of the second microphone 30a2 at the time 1/3*T25 after the transmission drive of the first microphone 30a1, controls the beginning of transmission drive of the third microphone 30a3 at the time 1/3*T25 after the transmission drive of the second microphone 30a2, and controls the beginning of transmission drive of the first microphone 30a1 at the time 1/3*T25 after the transmission drive of the third microphone 30a3. The three microphones do so circularly, and it can be known from the time sequence diagram FIG. 12 that the detection cycle of the three-microphone sensor is 1/3*T25. Thus, the detection cycle of the three-microphone sensor in this embodiment is one third of that of the traditional single-microphone sensor. Therefore, the detection response speed of the three-microphone sensor in this embodiment is three times that of the traditional single-microphone sensor, i.e. resulting in the rapid increase in response speed.

FIG. 8 is a structure diagram of a sensor provided with four microphones, and FIG. 9 is a structure diagram of a sensor provided with six microphones. The rest may be deduced by analogy. And then, if the number of the microphones on the automobile ultrasonic sensor of the present invention is increased to N, the detection cycle of the sensor is one Nth of that of the traditional single-microphone sensor with further improvement in the detection response speed.

The increase in detection response speed of the sensor is extremely beneficial for an application place requiring long (far) range. For example, if a blind spot monitoring system adopts the two-microphone or multi-microphone sensor of the present invention, the detection response speed of the sensor can be increased by two times or multiple times that of the traditional sensor, so that the response speed and the performance of the blind spot monitoring system are improved greatly.

The microphones on the two-microphone or multi-microphone sensor of the present invention are designed with different frequencies, for example, 40 k for the first microphone, 48 k for the second microphone, 58 k for the third microphone, etc. These designs are to avoid same-frequency interference to ensure that each microphone channel can accurately detect and recognize objects.

Figure 14:
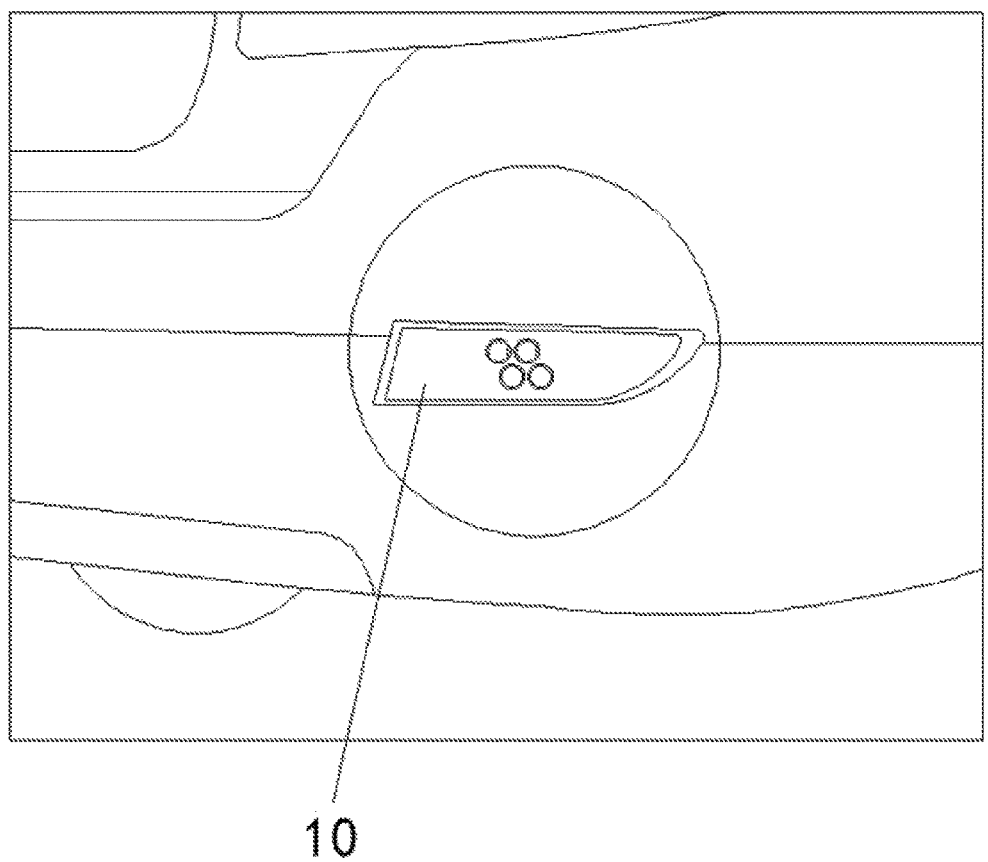
FIG. 14 is a schematic arrangement diagram of a blind spot sensor and a reflector assembly.

As is shown in FIG. 14, when the sensor of the present invention is used as a blind spot detection senor of an automobile blind spot monitoring system, the sensor is integrated with an automobile reflector 10. That is, the left two-microphone or multi-microphone blind spot sensors are integrated with the left reflector to form a left assembly (small assembly), and the right two-microphone or multi microphone blind spot sensors are integrated with the right reflector to form a right assembly, and then the left and right assemblies are fixed on an automobile rear bumper.

The arrangement in this manner has the following advantages: 1, the blind spot sensor is integrated with the reflector to make each microphone less visible so the overall rear appearance of the automobile looks better. If the two-microphone or multi-microphone blind spot sensors are mounted on the bumper directly, many microphones will be out of the outer surface, and due to the large size of the sensor, the two-microphone or multi-microphone sensors look too prominent on the bumper and pose a less elegant effect. 2. By adjusting the shapes and structures of the assemblies themselves and adjusting the positions and angles of the assemblies on the bumper, better arrangement direction and angle of the sensor can be easily selected on the automobile to obtain better detection performance. However, the arrangement of the blind spot sensors directly fixed on the bumper lacks such degree of adjustment freedom, and is difficult to do achieve the above effect. 3. Automobile bumpers are diverse in color, and the integration of the blind spot sensors with the reflector can greatly reduce the color category of paint sprayed to the appearance of the sensors. All that one need is only one or two colors that is or are matched with the reflector. However, if the sensors are directly mounted on the bumper, multiple colors of paints are needed in order to keep the appearances of the sensors in line with the color of the body, making the machining troublesome and the cost high.

Meanwhile, besides their use in common automobiles, the automobile ultrasonic detection method and the sensor of the present invention also can be applied to various types of vehicles having different sizes, such as tricycles, motorcycles, vehicles for the disabled, electric bicycles, etc. Any use of the automobile ultrasonic detection method and the sensor of the present invention fall into the scope of the present invention.

The invention claimed is:

1. An automobile ultrasonic detection method, comprising:
   controlling a plurality of microphones in a sensor to work cooperatively, the microphones respectively transmitting or receiving detection signals to or from the outside by adopting different working frequencies in a mutually spaced working time sequence; and
   in a detection cycle of a single microphone, the sensor completing multiple times of detection to improve the detection response speed of the sensor,
   wherein a working process of the plurality of microphones is as follows:
   1) N microphones are set, wherein N≥2, including a microphone 1, a microphone 2 . . . and a microphone N;
   2) the microphone 1, microphone 2 . . . and microphone N have different working frequencies, and the detection cycle of the single microphone is T;
   3) the microphone 1 begins detecting objects at the moment t0, and the single detection of the microphone 1 is completed at the moment (t0+T);
   4) the microphone 2 begins detecting objects at the moment (t0+T*(1/N)), and the single detection of the microphone 2 is completed at the moment (t0+T*(1+1/N));
   the working process of the following microphones is similar such that:
   the microphone N begins detecting objects at the moment (t0+T*{(N−1)/N}), and the single detection of the microphone N is completed at the moment (t0+T*{1±(N−1)/N});
   each microphone works cyclically within their working time according to their working time sequence, so that the detection cycle of the sensor becomes T*1/N, thus raising the detection response speed of the sensor.

2. An automobile ultrasonic sensor, comprising a plurality of microphones and an electronic circuit unit,
   wherein the electronic circuit unit respectively controls the microphones to transmit or receive detection signals to or from the outside by adopting different working frequencies in a mutually spaced working time sequence,
   wherein a working process of the plurality of microphones is as follows:
   1) N microphones are set, wherein N≥2, including a microphone 1, a microphone 2 . . . and a microphone N,
   2) the microphone 1, microphone 2 . . . and microphone N have different working frequencies, and the detection cycle of the single microphone is T;
   3) the microphone 1 begins detecting objects at the moment to, and the single detection of the microphone 1 is completed at the moment (t0+T);
   4) the microphone 2 begins detecting objects at the moment (t0+T*(1/N)), and the single detection of the microphone 2 is completed at the moment (t0+T*(1+1/N));
   the working process of the following microphones is similar such that:
   the microphone N begins detecting objects at the moment (t0+T*{(N−1)/N}), and the single detection of the microphone N is completed at the moment (t0+T*{1+(N−1)/N});
   each microphone works cyclically within their working time according to their working time sequence, so that the detection cycle of the sensor becomes T*1/N, thus raising the detection response speed of the sensor.

3. The automobile ultrasonic sensor according to claim 2, wherein the plurality of microphones are combined into an integral structure.

4. The automobile ultrasonic sensor according to claim 2, wherein the sensor further comprises a housing assembly unit and gum cover units mounted inside the housing assembly unit, and the housing assembly unit is provided with a connector unit.

5. The automobile ultrasonic sensor according to claim 4, wherein the microphones are fixedly arranged in the housing assembly unit via the gum cover units, the connector unit is an external hardware interface of the sensor, and the sensor transmits signals to the outside via the connector unit.

6. The automobile ultrasonic sensor according to claim 2, wherein the electronic circuit unit drives the microphones and amplifies, filters and operates echo signals to obtain a detection distance.

7. The automobile ultrasonic sensor according to claim 2, wherein a plurality of groups of ultrasonic transmitting modules and ultrasonic receiving modules are integrated in the electronic circuit unit, and one group of ultrasonic transmitting module and one ultrasonic receiving module corresponding to one microphone to control its work.

8. The automobile ultrasonic sensor according to claim 2, wherein a singlechip is integrated in the electronic circuit unit.

9. The automobile ultrasonic sensor according to claim 2, wherein a power module and a communication module are integrated in the electronic circuit unit, and the sensor transmits signals to the outside via the communication module.

10. The automobile ultrasonic sensor according to claim 9, wherein the sensor is provided with three pins for external connection: PIN1, PIN2 and PIN4, or provided with four pins: PIN1, PIN2, PIN3 and PIN4; in the sensor, the PIN1 is connected with the power module, the PIN4 is a ground terminal, the PIN2 is connected with the communication module, or the PIN2 and the PIN3 are respectively connected with the communication module.

11. The automobile ultrasonic sensor according to claim 2, wherein when the sensor is used as a blind spot detection senor of an automobile blind spot monitoring system, the sensor is integrated with an automobile reflector.

* * * * *